(12) United States Patent
Hofmanninger

(10) Patent No.: US 12,365,214 B2
(45) Date of Patent: Jul. 22, 2025

(54) TEMPERATURE-CONTROL DEVICE FOR A MOTOR VEHICLE AND MOTOR VEHICLE

(71) Applicant: Bayerische Motoren Werke Aktiengesellschaft, Munich (DE)

(72) Inventor: Stefan Hofmanninger, Weibern (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 518 days.

(21) Appl. No.: 17/953,440

(22) Filed: Sep. 27, 2022

(65) Prior Publication Data

US 2023/0095752 A1    Mar. 30, 2023

(30) Foreign Application Priority Data

Sep. 28, 2021   (DE) ..................... 10 2021 124 992.9

(51) Int. Cl.
*B60H 1/00*   (2006.01)
*B60K 1/00*   (2006.01)

(52) U.S. Cl.
CPC ..... *B60H 1/00278* (2013.01); *B60H 1/00385* (2013.01); *B60H 1/00921* (2013.01); *B60H 2001/00307* (2013.01); *B60K 2001/006* (2013.01)

(58) Field of Classification Search
CPC ........... B60H 1/00278; B60H 1/00385; B60H 1/00921; B60H 2001/00307; B60H 1/00885; B60H 1/32284; B60K 2001/006; B60K 2001/003; B60K 2001/005; B60K 11/02; Y02E 60/10
See application file for complete search history.

(56) References Cited

U.S. PATENT DOCUMENTS

| | | | | |
|---|---|---|---|---|
| 2020/0220236 | A1* | 7/2020 | Durrani | H01M 10/667 |
| 2020/0276882 | A1* | 9/2020 | Allgaeuer | B60H 1/143 |
| 2022/0055454 | A1* | 2/2022 | Lee | B60H 1/32284 |

FOREIGN PATENT DOCUMENTS

| | | | | |
|---|---|---|---|---|
| DE | 102012108043 A1 * | 5/2014 | | B60H 1/00278 |
| DE | 10 2017 220 376 A1 | 5/2019 | | |
| DE | 102019132688 A1 * | 6/2020 | | B60H 1/00278 |
| DE | 10 2019 100 096 A1 | 7/2020 | | |

(Continued)

OTHER PUBLICATIONS

DE—102019132688-A1 English Translation (Year: 2020).*

(Continued)

*Primary Examiner* — James A Shriver, II
*Assistant Examiner* — Michael T. Walsh
(74) *Attorney, Agent, or Firm* — Crowell & Moring LLP

(57) ABSTRACT

A temperature-control device for a motor vehicle includes at least one drive machine, whose temperature is to be controlled by way of a temperature-control fluid flowing through the temperature-control device, by which drive machine the motor vehicle can be driven. At least one electrical energy store, whose temperature is to be controlled via the temperature-control fluid flowing through the temperature-control device, stores electrical energy. An air-conditioning device is designed to control the temperature of air to be fed to the interior of the motor vehicle, and has a heat exchanger through which a refrigerant can flow and via which heat can be transferred between the refrigerant and the temperature-control fluid.

10 Claims, 1 Drawing Sheet

(56) References Cited

FOREIGN PATENT DOCUMENTS

| | | | | |
|---|---|---|---|---|
| DE | 102019121666 B3 | * | 1/2021 | |
| DE | 11 2019 006 348 T5 | | 9/2021 | |
| DE | 102020114851 A1 | * | 12/2021 | ......... B60H 1/00278 |
| DE | 102020206727 A1 | * | 12/2021 | |

OTHER PUBLICATIONS

DE—102019121666-B3 English Translation (Year: 2021).*
DE—102012108043-A1 English Translation (Year: 2014).*
DE—102020114851-A1 English Translation (Year: 2021).*
DE—102020206727-A1 English Translation (Year: 2021).*
German-language Search Report issued in German Application No. 10 2021 124 992.9 dated Jul. 18, 2022 with partial English translation (12 pages).

* cited by examiner

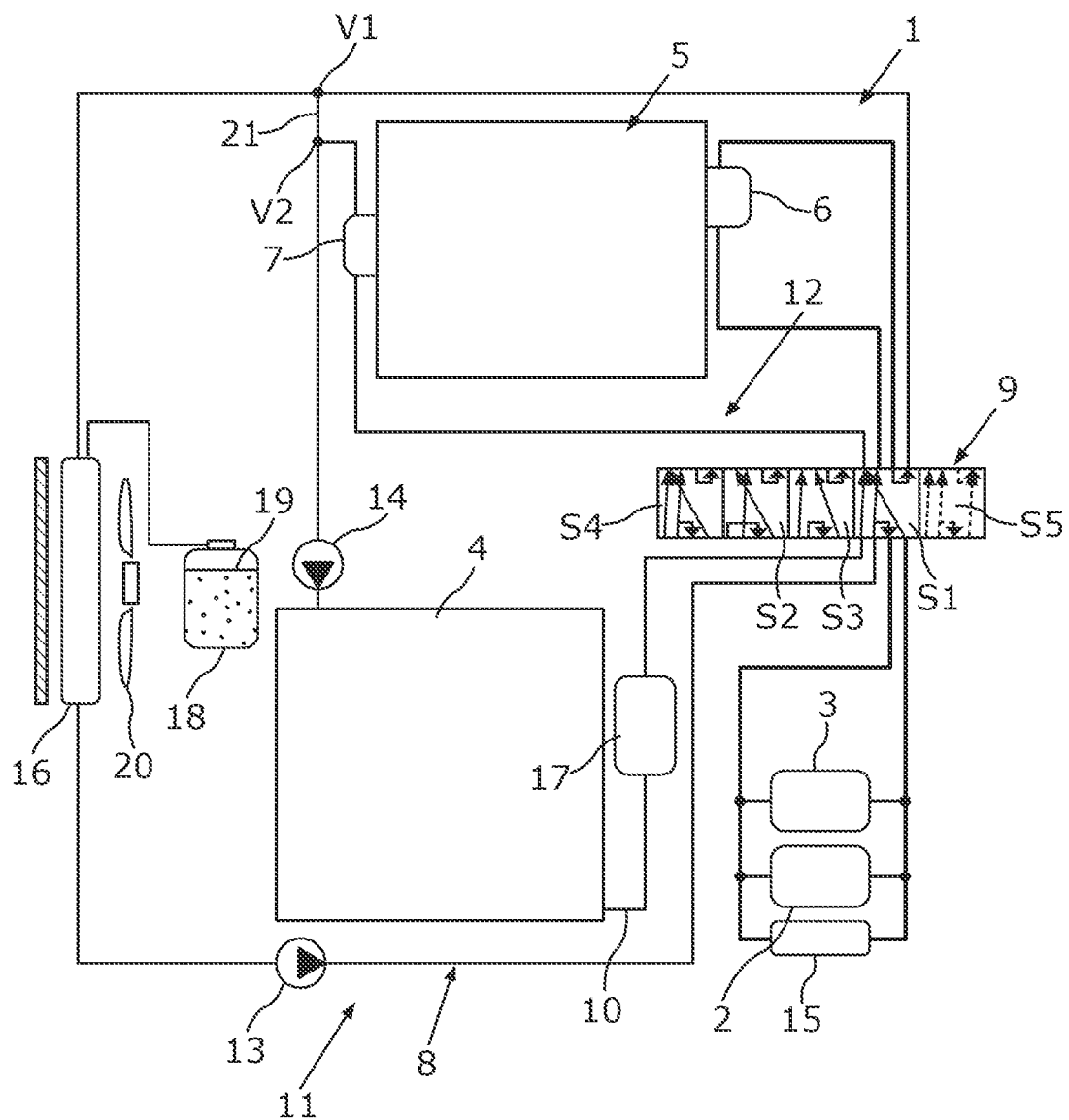

TEMPERATURE-CONTROL DEVICE FOR A MOTOR VEHICLE AND MOTOR VEHICLE

CROSS REFERENCE TO RELATED APPLICATIONS

This application claims priority under 35 U.S.C. § 119 from German Patent Application No. 10 2021 124 992.9, filed Sep. 28, 2021, the entire disclosure of which is herein expressly incorporated by reference.

BACKGROUND AND SUMMARY

The invention relates to a temperature-control device for a motor vehicle, in particular for a motor car. The invention furthermore relates to a motor vehicle, in particular a motor car.

A cooling system for a motor vehicle can be gathered as known from DE 10 2017 220 376 A1, having an electrical energy store for driving the motor vehicle. Furthermore, DE 10 2019 132 688 A1 discloses a thermal management system for a motor vehicle, having a motor chiller circuit in which a chiller, an electrical energy store and an electric motor are arranged.

The object of the present invention is to provide a temperature-control device for a motor vehicle, and a motor vehicle equipped with same, so that particularly advantageous temperature control can be achieved in a manner that is particularly optimized in terms of structural space and weight.

A first aspect of the invention relates to a temperature-control device for a motor vehicle, in particular for a motor car that is preferably in the form of a passenger motor car. This means that the motor vehicle that is preferably in the form of a motor car, in particular as a passenger motor car, in its fully manufactured state, has the temperature-control device, by means of which the temperature of at least part of the motor vehicle can be controlled, that is to say it can be cooled and/or heated. In particular, the temperature of the interior of the motor vehicle that is also designed as a passenger compartment or passenger cell can be controlled by means of the temperature-control device, for example, that is to say it can be cooled and/or heated, wherein people, such as the driver of the motor vehicle for example, can remain in the interior during a journey of the motor vehicle. The temperature-control device has at least one drive machine, whose temperature is to be controlled, i.e. which is to be cooled and/or heated, by means of a temperature-control fluid flowing through the temperature-control device, by means of which drive machine the motor vehicle can be driven. The drive machine is preferably an electric machine that can be operated in a motor mode and therefore as an electric motor, for example. The motor vehicle can be driven electrically, in particular fully electrically, by means of the electric motor and therefore by means of the electric machine. The electric machine is preferably a high-voltage component whose voltage, in particular operating or nominal voltage, is preferably greater than 50 volts, in particular greater than 60 volts, and is very preferably several hundred volts. This allows particularly high electrical power for the electric driving, in particular fully electric driving, of the motor vehicle to be achieved. In particular, the temperature-control fluid can flow through the drive machine, whose temperature is to be controlled thereby by means of the temperature-control fluid. The temperature-control fluid is preferably a liquid that can comprise, at least predominantly, water.

The temperature-control device furthermore has at least one electrical energy store, through which the temperature-control fluid can flow, and whose temperature is to be controlled, i.e. which is to be cooled and/or heated, thereby by means of the temperature-control fluid flowing through the temperature-control device, for storing electrical energy. The electrical energy store is preferably a high-voltage component whose voltage, in particular operating or nominal voltage, is preferably greater than 50 volts, in particular greater than 60 volts, and is very preferably several hundred volts. In particular, it is conceivable for the electric machine to able to be supplied with the electrical energy stored in the electrical energy store, as a result of which the electric machine can be operated in the motor mode. The temperature-control device furthermore has an air-conditioning device, by means of which the temperature of air that is to be fed or is fed to the interior of the motor vehicle is to be controlled, that is to say can be cooled and/or heated. The temperature of the interior can be controlled by controlling the temperature of the air that is to be fed to the interior. By way of example, the air-conditioning device is a compression refrigeration machine or at least can be operated in a compression refrigeration machine mode, and therefore as a compression refrigeration machine. By way of example, the air that is fed to the interior, i.e. is introduced into the interior, can be cooled by means of the compression refrigeration machine. Alternatively or additionally, the air-conditioning device can be a heat pump or can be operated in a heat pump mode, and therefore as a heat pump. In particular, the air that is to be fed to the interior can be heated by means of the heat pump, for example, as a result of which the interior can be heated or warmed. The air-conditioning device has a heat exchanger through which a refrigerant can flow and which is also referred to as first heat exchanger. The refrigerant is a further fluid that is provided in addition to the temperature-control fluid and in particular is different from the temperature-control fluid. In particular, it is conceivable for the heat exchanger (first heat exchanger) to be a condenser for condensing the refrigerant. Heat can be transferred or exchanged between the refrigerant and the temperature-control fluid via the heat exchanger. By way of example, heat can pass from the refrigerant to the temperature-control fluid via the heat exchanger in order to cool the refrigerant. Alternatively or additionally, it is conceivable for heat to pass from the temperature-control fluid to the refrigerant via the heat exchanger in order to thereby cool the temperature-control fluid.

In order to be able to achieve temperature control of the motor vehicle, in particular of the interior of the motor vehicle, that is particularly advantageous, optimized in terms of weight, structural space and costs, and is needs-oriented, provision is made, according to the invention, of a temperature-control branch, through which the temperature-control fluid can flow, and which is also referred to as a supply branch. The temperature-control device furthermore comprises a valve device, which is arranged downstream of the temperature-control branch, and to which the temperature-control fluid flowing through the temperature-control branch, i.e. the temperature-control fluid from the temperature-control branch, can be fed. The temperature-control fluid from the electrical energy store can also be fed to the valve device. In other words, the valve device can be supplied with the temperature-control fluid from the energy store, that is to say with the temperature-control fluid flowing out of the energy store and flowing away from the energy store, and the valve device can be supplied with the temperature-control fluid from the temperature-control branch. The temperature-control device is therefore arranged downstream of the temperature-control branch in the flow direction of the temperature-control fluid flowing through the temperature-control branch and therefore flowing from the temperature-control branch toward the valve device. The valve device is also arranged downstream of the energy store in the flow direction of the temperature-control fluid flowing through the energy store and flowing away from the energy store and toward the valve device.

The valve device can be changed over, in particular electrically, between a first switching state, a second switching state and a third switching state. In the first switching state, the drive machine and the heat exchanger can be supplied with the temperature-control fluid from the temperature-control branch via the valve device. Furthermore, in the first switching state, the drive machine and the heat exchanger are arranged in parallel with one another in terms of flow, i.e. are connected in parallel with one another. In the first switching state, the temperature-control fluid from the electrical energy store bypasses both the drive machine and the heat exchanger via the valve device. In other words, the temperature-control fluid from the electrical energy store, that is to say the temperature-control fluid flowing out of the electrical energy store and flowing away from the electrical energy store, does not flow through the drive machine and does not flow through the heat exchanger on its way away from the electrical energy store and via the valve device.

In the second switching state, the drive machine can be supplied with the temperature-control fluid from the electrical energy store via the valve device, and the heat exchanger can be supplied with the temperature-control fluid from the temperature-control branch via the valve device. In the second switching state, the drive machine and the heat exchanger are arranged in parallel with one another in terms of flow, that is to say they are connected in parallel with one another.

In the third switching state, the drive machine and the heat exchanger can be supplied with the temperature-control fluid from the temperature-control branch via the valve device, wherein the drive machine and the heat exchanger are connected in series with one another. By way of example, the drive machine is a first component, and the heat exchanger is a second component. In this respect, the feature whereby the drive machine and the heat exchanger are connected in series with one another should be understood to mean that the temperature-control fluid flows first through one of the components and subsequently through the other component. The feature whereby the components are connected in parallel with one another should be understood to mean that the temperature-control fluid flows through the components simultaneously. In other words, for example, a first partial quantity of the temperature-control fluid flows through one of the components, and a second partial quantity of the temperature-control fluid flows, in particularly simultaneously, through the other component.

In the third switching state, the temperature-control fluid from the electrical energy store bypasses both the drive machine and the heat exchanger via the valve device, such that the temperature-control fluid does not flow through the drive machine or through the heat exchanger on its way away from the electrical energy store and via the valve device. A particularly advantageous and needs-oriented interconnection possibility can be achieved by way of the valve device and the switching states, such that the temperature-control fluid can be guided or led and in a manner that is needs-oriented and particularly optimized in terms of structural space, costs and weight.

The valve device preferably comprises at least one or precisely one valve element that is arranged, for example, in a valve housing of the valve device and can be moved in rotation and/or in translation relative to the valve housing. This valve element can be moved, in particular electrically and/or relative to the valve housing, into respective switching positions that effect the respective switching states, for example. The temperature-control fluid can therefore be led in a manner that is particularly optimized in terms of structural space, weight and costs, and needs-oriented. The invention can furthermore avoid committing to a parallel or series connection, and so a particularly high degree of flexibility can be achieved. An excessive number of actuator elements, which are also referred to simply as actuators, can also be kept particularly low, such that the number of parts, the costs, the structural space requirement and the weight of the temperature-control device can be kept within particularly low limits.

In order to be able to achieve temperature control that is particularly advantageous and in particular energy efficient, provision is made, in one embodiment of the invention, for the air-conditioning device to have a second heat exchanger, provided in addition to the heat exchanger, via which heat can be transferred or exchanged between the refrigerant and the temperature-control fluid. By way of example, the second heat exchanger is what is known as a chiller, via which, for example, heat can be transferred from the temperature-control fluid to the refrigerant, as a result of which the temperature-control fluid is cooled and the refrigerant is heated. The refrigerant heated thereby or the heat from the temperature-control fluid, which is transferred via the chiller to the refrigerant, can be used, for example, to heat the interior, in particular in such a way that the heat, which is passed to the refrigerant via the chiller, is transferred via the first heat exchanger to the air that is fed to the interior, i.e. is introduced into the interior. This can ensure particularly energy-efficient heating of the interior.

A further embodiment is distinguished by the fact that, in the first switching state, both the temperature-control fluid from the drive machine and the temperature-control fluid from the electrical energy store can be fed or are fed to the second heat exchanger via the valve device, meaning that the second heat exchanger is connected in series with the drive machine and in series with the electrical energy store. In this case, the temperature-control fluid from the first heat exchanger bypasses the second heat exchanger via the valve device, as a result of which particularly advantageous and energy-efficient temperature control can be achieved.

Provision is made, in a further configuration of the invention, for the valve device to be able to be switched to a fourth switching state in order to be able to achieve temperature control that is particularly needs-oriented in a particularly simple manner. In the fourth switching state, both the drive machine and the heat exchanger can be supplied with the temperature-control fluid from the temperature-control branch via the valve device, wherein the drive machine and the heat exchanger are connected in parallel with one another. In the fourth switching state, the temperature-control fluid from the energy store bypasses the drive machine and the first heat exchanger via the valve device. In the fourth switching state, the temperature-control fluid from the electrical energy store can be fed to the second heat exchanger via the valve device. Furthermore, provision is made, in the fourth switching state, for the temperature-control fluid from the drive machine and the temperature-control fluid from the first heat exchanger to bypass the second heat exchanger via the valve device.

In one particularly advantageous embodiment of the invention, the heat exchanger is in the form of, or can be operated as, a cooling device, in particular a condenser, via which heat can be transferred from the refrigerant to the temperature-control fluid in order to cool the refrigerant. Temperature control that is particularly energy-efficient can be achieved as a result.

A further embodiment is distinguished by the fact that, in the third switching state, the first heat exchanger is arranged downstream of the drive machine. This can achieve particularly efficient temperature control, wherein, in particular, the temperature of the drive machine can be controlled, in particular can be cooled, in a particularly effective and efficient manner.

In a further configuration of the invention, the temperature-control branch and the electrical energy store are connected in parallel with one another, as a result of which the temperature-control fluid can be guided particularly well and the temperature can be controlled particularly well.

In a further, particularly advantageous embodiment of the invention, an electrical heating element, which for example is in the form of an electric flow heater (EFH), is arranged downstream of the electrical energy store and upstream of the valve device. The electrical heating element can be used to heat the temperature-control fluid flowing from the electrical energy store to the valve device and, here for example, flowing through the electrical heating element, as a result of which the temperature-control fluid can be heated in a manner that is particularly needs-oriented.

Finally, it has been shown to be particularly advantageous if the temperature-control device has a cooler, around which air, in particular ambient air, can flow, and therefore also being referred to as ambient air cooler, which can be supplied with the temperature-control fluid from the heat exchanger and/or from the electric machine via the valve device, and through which the temperature-control fluid from the heat exchanger and/or from the electric machine can therefore flow. The temperature-control fluid can be cooled using the cooler by means of the air flowing around the cooler, in particular in that heat can pass from the temperature-control fluid flowing through the cooler to the air flowing around the cooler via the cooler. In particular, the cooler is a high-temperature cooler (HT cooler). The temperature-control fluid can be cooled particularly effectively and efficiently by means of the cooler, and so particularly good temperature control can be achieved.

A second aspect of the invention relates to a motor vehicle that is preferably in the form of a motor car, in particular a passenger motor car, which has a temperature-control device according to the invention. Advantages and advantageous configurations of the first aspect of the invention can be considered to be advantages and advantageous configurations of the second aspect of the invention, and vice versa.

Other objects, advantages and novel features of the present disclosure will become apparent from the following detailed description of one or more preferred embodiments when considered in conjunction with the accompanying drawing.

BRIEF DESCRIPTION OF THE DRAWING

The single FIGURE is a schematic illustration of a temperature-control device for a motor vehicle.

DETAILED DESCRIPTION OF THE DRAWING

The FIGURE shows a schematic illustration of a temperature-control device 1 of a motor vehicle that is preferably in the form of a motor car, in particular a passenger motor car. The motor vehicle has an interior, which is also referred to as the passenger cell or passenger compartment, in which people, such as the driver of the motor vehicle for example, can remain during a journey of the motor vehicle. By way of example, the motor vehicle has at least two or precisely two axles arranged so as to follow one another in the longitudinal direction of the vehicle, and therefore one behind the other. The respective axle comprises at least two or precisely two wheels, also referred to as vehicle wheels, which are opposite one another in the transverse direction of the vehicle, i.e. can be arranged on sides of the motor vehicle that are opposite one another in the transverse direction of the vehicle. The respective wheel is a ground contact element, via which the motor vehicle can be supported or is supported downwardly on a roadway in the vertical direction of the vehicle. When the motor vehicle is driven along the roadway, while the motor vehicle is supported on the roadway in the vertical direction of the vehicle by the vehicle wheels, the wheels roll along the roadway. A first one of the axles is a front axle, the wheels of which are also referred to as front wheels. The axle arranged behind the front axle in the longitudinal direction of the vehicle is a rear axle, the wheels of which are also referred to as rear wheels.

The temperature-control device has a first drive machine 2, whose temperature is to be controlled, that is to say which is to be cooled and/or heated, by means of a temperature-control fluid flowing through the temperature-control device 1 and in this case the drive machine 2. Preferably, the temperature-control fluid is a liquid that includes at least water. In the exemplary embodiment shown in FIG. 1, the temperature-control device 1 also has a second drive machine 3, whose temperature likewise can be controlled by means of the temperature-control fluid, in particular in that the temperature-control fluid can flow through the drive machine 3. In the exemplary embodiment shown in FIG. 1, the drive machines 2 and 3 are connected in parallel with one another on the basis of a respective flow of the temperature-control fluid through the respective drive machine 2 or 3. The respective drive machine 2 or 3 is preferably an electric machine, by means of which the motor vehicle can be driven electrically, in particular fully electrically. In the exemplary embodiment shown in FIG. 1, the drive machine 2 is assigned to the rear axle, the rear wheels of which can be driven electrically, in particular fully electrically, by means of the drive machine 2. Accordingly, the drive machine 3 is assigned to the front axle, the front wheels of which can be driven electrically, in particular fully electrically, by means of the electric machine 3.

The temperature-control device 1 also has an electrical energy store 4, in which, or by means of which, electrical energy can be stored or is stored. The temperature-control fluid flowing through the temperature-control device 1 can flow through the energy store 4, such that the temperature of the energy store 4 can be controlled, that is to say it can be cooled and/or heated, by means of the temperature-control fluid. The drive machines 2 and 3 can be supplied with the electrical energy stored in the energy store 4.

Furthermore, the temperature-control device 1 comprises an air-conditioning device 5 that has, for example, a refrigerant circuit through which a refrigerant can flow. The air-conditioning device 5 also comprises a first heat exchanger 6 that is arranged in the refrigerant circuit and through which the refrigerant can therefore flow. In the exemplary embodiment shown in FIG. 1, the first heat exchanger 6 is a cooling device and in particular is a condenser for cooling, in particular for condensing, the refrigerant. Both the refrigerant and the temperature-control fluid can flow through the heat exchanger 6. Heat can be exchanged or transferred between the refrigerant flowing through the heat exchanger 6 and the temperature-control fluid flowing through the heat exchanger 6 via the heat exchanger 6, in particular in such a way that heat can pass from the refrigerant to the temperature-control fluid via the heat exchanger 6, as a result of which the refrigerant is cooled and the temperature-control fluid is heated. The refrigerant can be condensed as a result. The heat exchanger 6 is therefore also referred to as condenser below. Since the temperature-control fluid is a liquid and in particular includes water, the condenser (heat exchanger 6) is also referred to as a condenser or heat exchanger through which liquid flows or liquid-cooled condenser or heat exchanger, in particular as a condenser or heat exchanger through which water flows or water-cooled condenser or heat exchanger.

The temperature of air that is to be fed or is fed to the interior of the motor vehicle, i.e. is introduced into the interior, can be controlled, that is to say can be cooled and/or heated, by means of the air-conditioning device 5. By way of example, a refrigerant compressor, by means of which the refrigerant can be conveyed through the refrigerant circuit, is also arranged in the refrigerant circuit. The refrigerant compressor can in particular compress the refrigerant. Furthermore, an evaporator of the air-conditioning device 4 can be arranged in the refrigerant circuit, for example. The refrigerant is evaporated by means of the evaporator. Heat can pass from the air that is to be fed to the interior, and that is also referred to as interior air, to the refrigerant flowing through the evaporator by way of the evaporator, which is a further heat exchanger, as a result of which the interior air is cooled and the refrigerant is heated. In particular, an expansion element, in particular an expansion valve, can be arranged upstream of the evaporator and in particular downstream of the heat exchanger 6, in order to expand the refrigerant.

The air-conditioning device 5 also comprises a second heat exchanger 7 that is in the form of a chiller, or is also referred to as a chiller, in the exemplary embodiment shown in FIG. 1. When mention is made below to the chiller, this is to be understood to mean the heat exchanger 7, unless stated otherwise. The refrigerant and the temperature-control fluid can flow through the heat exchanger 7, such that heat can be exchanged or transferred between the temperature-control fluid and the refrigerant via the second heat exchanger 7, in particular in such a way that heat can pass from the temperature-control fluid to the refrigerant via the heat exchanger 7. The temperature-control fluid is cooled as a result. The heat exchanger 7 is arranged upstream of the energy store 4 in the flow direction of the temperature-control fluid flowing through the energy store 4 and/or flowing toward the energy store 4.

In order to be able to achieve temperature control of the motor vehicle, in particular of the interior, that is particularly needs-oriented, and effective and energy-efficient, in a manner that is particularly optimized in terms of costs, weight and structural space, the temperature-control device 1 has a temperature-control branch 8, which is also referred to as a supply branch, through which the temperature-control fluid can flow. Furthermore, the temperature-control device 1 comprises a valve device 9 that is in the form of a switching valve in the exemplary embodiment shown in FIG. 1. The valve device 9 is arranged downstream of the temperature-control branch 8 in the flow direction of the temperature-control fluid flowing through the temperature-control branch 8 such that the temperature-control fluid from the temperature-control branch 8 can be fed to the valve device 9. In other words, the valve device 9 can be supplied with the temperature-control fluid flowing through the temperature-control branch 8, i.e. with the temperature-control fluid from the temperature-control branch 8. Furthermore, the temperature-control fluid from the energy store 4 can be fed to the valve device 9, in particular via a second temperature-control branch 10. By way of example, the temperature-control branch 8 is part of a first temperature-control circuit through which the temperature-control fluid can flow, and which is also referred to as the first circuit. Alternatively or additionally, the second temperature-control branch 10 can be part of a second temperature-control circuit, which is referred to as the second circuit and through which the temperature-control fluid can flow. In FIG. 1, the first temperature-control circuit is denoted by 11 and the second temperature-control circuit is denoted by 12. In this case, it can be seen that the energy store 4 is arranged in the second temperature-control circuit 12 and the temperature thereof is therefore to be controlled in particular by means of the temperature-control fluid flowing through the second temperature-control circuit 12.

A first pump 13, by means of which the temperature-control fluid can be conveyed through the temperature-control branch 8 and therefore through the temperature-control circuit 11, is arranged in the temperature-control branch 8, in particular in the first temperature-control circuit 11. A second pump 14, by means of which the temperature-control fluid can be conveyed through the second temperature-control circuit 12 and therefore through the energy store 4, is arranged in the second temperature-control circuit 12. The respective pump 13 or 14 is preferably in the form of an electric pump and can therefore be operated electrically.

The valve device 9 can be changed over between a first switching state S1, a second switching state S2 and a third switching state S3. In the exemplary embodiment shown in FIG. 1, the valve device 9 can also be switched to a fourth switching state S4 and to a fifth switching state S5 and therefore can be changed over, in particular electrically, between the switching states S1-5. To this end, the valve device 9 comprises, for example, a valve housing and a valve element that is arranged in particular in the valve housing and that is in the form of a sliding body, for example. By way of example, the valve element can be moved, in particular in translation, relative to the valve housing into different, respective switching positions that effect the respective switching states S1-5.

In the exemplary embodiment shown in FIG. 1, the temperature-control device also has a further component 15 that is connected in parallel with the drive machines 2 and 3. The explanations above and below relating to the drive machine 2 can be transferred to the drive machine 3 and vice versa, and the explanations above and below relating to the drive machines 2 and 3 can also be transferred to the components 15 and vice versa. The drive machines 2 and 3 and the component 15, which for example is in the form of an electronic computing device, that is to say a control device, are also referred to in combination as devices. By way of example, the devices form a temperature-control block or are also referred to as a temperature-control block.

In the first switching state S1, the temperature-control block and therefore the drive machines 2 and 3 and the component 15, as well as the first heat exchanger 6, can be supplied with the temperature-control fluid from the temperature-control branch 8 via the valve device 9 and are connected in parallel with one another. The text below refers in particular to the drive machine 2, wherein the explanations above and below relating to the drive machine 2 can also be transferred to the drive machine 3 and the component 15. In the first switching state S1, provision is therefore made for the drive machine 2 and the first heat exchanger 6 (condenser) to be able to be supplied with the temperature-control fluid from the temperature-control branch 8 via the valve device 9 and to be connected in parallel with one another. Furthermore, in the first switching state S1, the temperature-control fluid from the electrical energy store 4, and therefore from the temperature-control branch 10, bypasses both the drive machine 2 and the heat exchanger 6 via the valve device 9. An ambient air cooler 16, which is referred to simply as a cooler, around which air from or in a surrounding area of the motor vehicle can flow, is arranged in the temperature-control branch 8 and therefore in the first temperature-control circuit 11. The air flowing around the ambient air cooler 16 is also referred to as ambient air, whereas the air that is fed to the interior is also referred to as interior air. The temperature-control fluid, that is to say the temperature-control fluid flowing through the temperature-control branch 8 or the first temperature-control circuit 11, can flow through the ambient air cooler 16, wherein heat can pass from the temperature-control fluid flowing through the ambient air cooler 16, and therefore the temperature-control branch 8, to the ambient air flowing around the ambient air cooler 16 via the ambient air cooler 16. The temperature-control fluid flowing through the ambient air cooler 16 is cooled as a result. In the first switching state S1, provision is made, in particular, for the drive machine 2 to be connected in series with the ambient air cooler 16 (cooler), wherein it is conceivable for the heat exchanger 6, which is also referred to as the WCC, to be able to be arranged or connected in parallel with the cooler 16.

In the second switching state S2, the drive machine 2 can be supplied with the temperature-control fluid from the electrical energy store 4, and therefore from the temperature-control branch 10, via the valve device 9, and the first heat exchanger 6 can be supplied with the temperature-control fluid from the temperature-control branch 8 via the valve device 9. In the second switching state S2, the drive machine 2 and the first heat exchanger 6 are connected in parallel with one another. Furthermore, it is conceivable, for example in the second switching state S2, for the temperature-control fluid from the drive machine 2 to bypass the cooler (ambient air cooler 16), in particular via the valve device 9, wherein it is alternatively or additionally conceivable for the WCC to be able to be connected in parallel with the cooler.

In the third switching state S3, the drive machine 2 and the first heat exchanger 6 can be supplied with the temperature-control fluid from the temperature-control branch 8 via the valve device 9, wherein the drive machine 2 and the first heat exchanger 6 (WCC) are connected in series with one another. In the third switching state S3, the temperature-control fluid from the electrical energy store 4, and therefore from the temperature-control branch 10, bypasses the drive machine 2 and the first heat exchanger 6 via the valve device 9.

Furthermore, provision is made, in the first switching state S1, for both the temperature-control fluid from the drive machine 2 and the temperature-control fluid from the electrical energy store 4 or the temperature-control branch 10 to be able to be fed to the second heat exchanger 7 (chiller) via the valve device 9, meaning that the second heat exchange 7 is connected in series with the drive machine 2 and in series with the electronic energy store 4. Here, the temperature-control fluid from the first heat exchanger 6 bypasses the second heat exchanger 7 via the valve device 9. This means that, in the first switching state S1, the temperature-control fluid bypasses the heat exchanger 7 on its way from the heat exchanger 6 to the cooler (ambient air cooler 16) and/or to the energy store 4 via the valve device 9.

In the fourth switching state S4, the drive machine 2 and the first heat exchanger 6 can be supplied with the temperature-control fluid from the temperature-control branch 8 via the valve device 9, wherein, in the fourth switching state S4, the drive machine 2 and the first heat exchanger 6 are connected in parallel with one another. In the fourth switching state S4, the temperature-control fluid from the energy store 4 bypasses the drive machine 2 and the first heat exchanger 6 via the valve device, meaning that the temperature-control fluid from the energy store 4 does not flow through the drive machine and does not flow through the first heat exchanger 6 on its way to the and through the heat exchanger 7. In the fourth switching state S4, the temperature-control fluid from the electrical energy store 4 can be fed to the second heat exchanger 7 via the valve device 9, and, in the fourth switching state S4, both the temperature-control fluid from the drive machine 2 and the temperature-control fluid from the first heat exchanger 6 bypass the second heat exchanger 7 via the valve device 9, meaning that the temperature-control fluid from the heat exchanger 6 and from the drive machine 2 does not flow through the heat exchanger 7 on its way from the heat exchanger 6 and the drive machine 2 to the valve device 9.

The temperature-control branch 8 and the electrical energy store 4 or the temperature-control branch 10 are connected in parallel with one another. In the temperature-control branch 10, an electrical heating element 17, which for example is in the form of an electric flow heater, and by means of which the temperature-control fluid, in particular on its way from the energy store 4 to the valve device 9, can be heated in an effective and efficient manner, is arranged downstream of the energy store 4 and upstream of the valve device 9.

The temperature-control device 1 also comprises a compensation tank 18, in which a quantity 19 of the temperature-control fluid is accommodated. This allows fluctuations in volume and/or quantity of the temperature-control fluid in the temperature-control branches 8 and 10, and therefore in particular in the temperature-control circuits 11 and 12, to be compensated for. Furthermore, a fan 20 is assigned to the ambient air cooler 16, by means of which fan the air, in particular the ambient air, can be conveyed, which then flows around the ambient air cooler 16. In particular, the fan 20 is an electrical fan.

In the exemplary embodiment shown in FIG. 1, the valve device 9 can also be switched to the fifth switching state S5 in which, for example, the heat exchanger 6 is switched off. This should be understood in particular to mean that, for example, in the fifth switching state S5, there is no supply of the temperature-control fluid to the heat exchanger 6. In particular, if the valve device 9 can be switched to the switching states S1-4, but not also to the switching state S5, the valve device 9 is, for example, in the form of a 4/4-way valve. If, for example, the valve device 9 can be switched to the switching positions S1-5, the valve device 9 is in the form of a 4/5-way valve, for example. The fifth switching state S5 is optional and can be omitted, for example.

It can be seen in FIG. 1 that the temperature-control branches 8 and 10 and/or the temperature-control circuits 11 and 12 are or can be fluidically connected to one another via a connecting line 21. In this case, the connecting line 21 is fluidically connected to the temperature-control branch 8 and/or the first circuit at a connecting point V1. Furthermore, the connecting line 21 is fluidically connected to the temperature-control branch 10, and therefore to the electrical energy store 4, and/or to the second temperature-control circuit 12 (second circuit) at a connecting point V2. The connecting point V1 is arranged downstream of the valve device 9 and upstream of the ambient air cooler 16 in the flow direction of the temperature-control fluid flowing from the valve device 9 to the cooler (ambient air cooler 16). The connecting point V2 is arranged downstream of the heat exchanger 7 and upstream of the temperature-control branch 10, in particular of the energy store 4 and/or the pump 14, in the flow direction of the temperature-control fluid flowing from the heat exchanger 7 toward the pump 14, and therefore toward the energy store 4 and toward the temperature-control branch 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Temperature-control device
2 Drive machine
3 Drive machine
4 Electrical energy store
5 Air-conditioning device
6 First heat exchanger
7 Second heat exchanger
8 Temperature-control branch
9 Valve device
10 Temperature-control branch
11 Temperature-control circuit
12 Temperature-control circuit
13 Pump
14 Pump
15 Component
16 Cooler
17 Electrical heating element
18 Compensation tank
19 Quantity
20 Fan
21 Connecting line
S1 First switching state
S2 Second switching state
S3 Third switching state
S4 Fourth switching state
S5 Fifth switching state
V1 Connecting point
V2 Connecting point

What is claimed is:

1. A temperature-control device for a motor vehicle, comprising:
    at least one drive machine, whose temperature is to be controlled via a temperature-control fluid flowing through the temperature-control device, by which drive machine the motor vehicle is drivable;
    at least one electrical energy store, whose temperature is to be controlled via the temperature-control fluid flowing through the temperature-control device, for storing electrical energy; and
    an air-conditioning device configured to control the temperature of air to be fed to an interior of the motor vehicle, and that has a heat exchanger through which a refrigerant flows and via which heat is transferable between the refrigerant and the temperature-control fluid,
    wherein the temperature-control device further comprises:
    a temperature-control branch, through which the temperature-control fluid flows, and a valve device, which is arranged downstream of the temperature-control branch, and to which the temperature-control fluid from the temperature-control branch and the temperature-control fluid from the electrical energy store is fed and which is changeable over between:
        (i) a first switching state in which:
            the drive machine and the heat exchanger are supplied with the temperature-control fluid from the temperature-control branch via the valve device and are connected in parallel with one another, and
            the temperature-control fluid from the electrical energy store bypasses the drive machine and the heat exchanger via the valve device,
        (ii) a second switching state in which:
            the drive machine is supplied with the temperature-control fluid from the electrical energy store via the valve device,
            the heat exchanger is supplied with the temperature-control fluid from the temperature-control branch via the valve device, and
            the drive machine and the heat exchanger are connected in parallel with one another, and
        (iii) a third switching state in which:
            the drive machine and the heat exchanger are supplied with the temperature-control fluid from the temperature-control branch via the valve device and are connected in series with one another, and
            the temperature-control fluid from the electrical energy store bypasses the drive machine and the heat exchanger via the valve device.

2. The temperature-control device according to claim 1, wherein
    the air-conditioning device has a second heat exchanger, provided in addition to the heat exchanger, via which heat is transferable between the refrigerant and the temperature-control fluid.

3. The temperature-control device according to claim 2, wherein
    in the first switching state, both the temperature-control fluid from the drive machine and the temperature-control fluid from the electrical energy store are fed to the second heat exchanger via the valve device, the second heat exchanger being connected in series with the drive machine and in series with the electrical energy store,
    wherein the temperature-control fluid from the first heat exchanger bypasses the second heat exchanger via the valve device.

4. The temperature-control device according to claim 3, wherein
    the valve device is switchable to a fourth switching state in which:
        the drive machine and the heat exchanger are supplied with the temperature-control fluid from the temperature-control branch via the valve device and are connected in parallel with one another,
        the temperature-control fluid from the energy store bypasses the drive machine and the first heat exchanger via the value device, the temperature-control fluid from the electrical energy store is fed to the second heat exchanger via the valve device, and the temperature-control fluid from the drive machine and the temperature-control fluid from the first heat exchanger bypass the second heat exchanger via the valve device.

5. The temperature-control device according to claim 1, wherein the heat exchanger is operated as a cooling device via which heat is transferrable from the refrigerant to the temperature-control fluid in order to cool the refrigerant.

6. The temperature-control device according to claim 1, wherein in the third switching state, the heat exchanger is arranged downstream of the drive machine.

7. The temperature-control device according to claim 1, wherein the temperature-control branch and the electrical energy store are connected in parallel with one another.

8. The temperature-control device according to claim 1, further comprising:

an electrical heating element, by which the temperature-control fluid flowing from the electrical energy store to the valve device is heatable, arranged downstream of the electrical energy store and upstream of the valve device.

9. The temperature-control device according to claim 1, further comprising:

a cooler around which air flows, which is supplied with the temperature-control fluid from the heat exchanger and/or from the drive machine via the valve device, and using which the temperature-control fluid is to be cooled by way of air.

10. A motor vehicle comprising a temperature-control device according to claim 1.

* * * * *